US012593152B2

(12) United States Patent
Zhao et al.

(10) Patent No.: US 12,593,152 B2
(45) Date of Patent: Mar. 31, 2026

(54) DISTRIBUTED OPTICAL SWITCHING AND INTERCONNECT CHIP AND SYSTEM

(71) Applicant: Hangzhou Lightip Technologies Co., Ltd., Hangzhou (CN)

(72) Inventors: Jiasheng Zhao, Hangzhou (CN); Jianjun He, Hangzhou (CN)

(73) Assignee: Hangzhou Lightip Technologies Co., Ltd., Hangzhou City (CN)

( * ) Notice: Subject to any disclaimer, the term of this patent is extended or adjusted under 35 U.S.C. 154(b) by 272 days.

(21) Appl. No.: 18/494,539

(22) Filed: Oct. 25, 2023

(65) Prior Publication Data

US 2024/0056705 A1 Feb. 15, 2024

(30) Foreign Application Priority Data

Oct. 28, 2022 (CN) .......................... 202211332681.2

(51) Int. Cl.
*H04Q 11/00* (2006.01)

(52) U.S. Cl.
CPC ..... *H04Q 11/0005* (2013.01); *H04Q 11/0067* (2013.01); *H04Q 2011/0032* (2013.01); *H04Q 2011/0054* (2013.01); *H04Q 2011/0092* (2013.01)

(58) Field of Classification Search
CPC ................................................. H04Q 11/0005
See application file for complete search history.

(56) References Cited

U.S. PATENT DOCUMENTS 9,794,657 B1 * 10/2017 Jiang .................. H04Q 11/0005
11,892,746 B1 * 2/2024 Mazed .................... G02F 1/212

FOREIGN PATENT DOCUMENTS

CN          107710702 A      2/2018
CN          113285760 A   *  8/2021   ......... H04Q 11/0005

* cited by examiner

*Primary Examiner* — Shi K Li

(57) ABSTRACT

This invention discloses a distributed optical switching and interconnect chip and system having multiple connected nodes, each node including an optical routing unit with one side having multiple internal input/output ports and the other side having multiple external input/output ports, a laser array and a photodetector array, connected to the internal input and output ports, respectively. The external output ports are connected to the external input ports of other nodes through optical waveguides. The signals received by the photodetectors can be dropped to the node or re-routed to the lasers by an electronic packet switching chip for re-transmission to other nodes. The invention integrates and encapsulates laser arrays, photodetector arrays, optical routing units and interconnection network in one chip. The distributed optical switching chip and system architecture have the advantages of high scalability, low latency and low power consumption, and can be used for multi-chip computing systems and datacenters.

17 Claims, 10 Drawing Sheets

DISTRIBUTED OPTICAL SWITCHING AND INTERCONNECT CHIP AND SYSTEM

CROSS-REFERENCE TO RELATED APPLICATIONS

This application claims the benefit of priority from Chinese Patent Application No. 202211332681.2 filed on Oct. 28, 2022. The content of the aforementioned application, including any intervening amendments thereto, is incorporated herein by reference in its entirety.

TECHNICAL FIELD

The invention relates to a photonic integrated chip and system for distributed optical switching and interconnect, which are suitable for the technical fields of wafer-level high-performance computing systems, optical switching and interconnect in data centers, and optical communication networks.

BACKGROUND OF THE PRESENT INVENTION

With the rapid growth of applications such as cloud computing, data centers, Internet of Things, virtual reality, and high-definition short videos, the amount of global data is exploding, and it is necessary to continuously expand the infrastructure of high-performance computing and data centers. One of the core technologies is the large-capacity high-speed switching chips and the interconnect systems. At present, data transmission between servers in datacenters and high-performance computers has adopted optical interconnect technology on a large scale. The research on optical interconnect between servers and on-chip optical interconnect mainly focuses on the transceiver and transmission of optical information in the optical interconnection network. However, the network switching is still based on electronic switching chips. On one hand, it requires optical-electrical-optical conversions with high energy consumption and large delay. Optical transceiver modules or co-packaged optics (CPO) are required to connect electronic switching chips with external optical transmitter and receiver chips. On the other hand, state-of-the-art semiconductor manufacturing process is required for high-end electronic switching chips. For long-haul optical communications, wavelength selective switches (WSS) based on liquid-crystal-on-silicon (LCOS) or microelectromechanical systems (MEMS) have been used, which are bulky, slow and expensive.

At present, the switching capacity of top-level electronic switching chips is 25.6~51.2 Tbps, and the top-level semiconductor process of 5~7 nm is required for the fabrication. With Moore's Law approaching its limit, the further increase in the capacity of electronic switching chips has been greatly restricted. Optical switching technology has become a means for datacenters and high-performance computing systems to continue to improve performance in the post-Moore era. In addition, in order to process massive data, data processing models and algorithms such as artificial intelligence are constantly being upgraded, and the requirements for computing power of computing systems are getting higher and higher. Due to the limitations of Moore's Law, it is impossible to integrate more and more transistors on a single chip to maintain the continuous improvement of computing power. Based on wafer-level advanced packaging technology, a wafer-level system-on-a-chip that integrates multiple independently manufactured modular functional chips (or chiplets) is an important means to extend Moore's Law. In this case, the bottleneck for the performance improvement of high-performance computing systems is not the performance limitation of a single computing node, but the information transmission and exchange capacity between multiple computing nodes. Therefore, high-capacity switching and interconnects between chips will become the key to building more powerful computing systems.

SUMMARY OF THE PRESENT INVENTION

The technical problem to be solved by the present invention is to provide a distributed optical switching and interconnect chip and system between communication or computing nodes based on the distributed optical switching technology, aiming at the above existing problems.

The technical scheme adopted in the present invention is: a distributed optical switching and interconnect chip or system, which is characterized in that it has a plurality of directly or indirectly connected nodes, and each node includes:

An optical routing unit, which has a plurality of internal input/output ports on one side and a plurality of external input/output ports on the other side;

A laser array, connected to the internal input port of the optical routing unit, for converting electrical signals into optical signals and sending them to the optical routing unit;

A photodetector array, connected to the internal output port of the optical routing unit, for converting the optical signals received by the optical routing unit into electrical signals;

The external input/output ports of the optical routing unit are the input/output ports of the corresponding node, and the output ports of the node are connected to the input ports of other nodes through optical waveguides.

Each node has two of the optical routing units, corresponding to the transmitter side routing unit and the receiver side routing unit, respectively. The transmitter-side routing unit has internal input ports connected to lasers, and external output ports. The receiver-side routing unit has internal output ports connected to photodetectors, and external input ports. The signals received by the photodetectors at the receiver-side can be dropped to the node or re-routed to the lasers at the transmitter-side by an electronic packet switching chip for re-transmission to other nodes. The optical routing unit has only a minimum loss at a specific wavelength between any pair of internal port and external port.

The optical routing unit adopts a cyclic array waveguide grating router or a cyclic etched diffraction grating router.

Each element of the laser array is composed of a wavelength-switchable or tunable laser with an integrated high-speed modulator.

The laser array comprises:

An intracavity wavelength router, wherein any combination of input and output ports has the smallest loss only at a specific wavelength;

A port-selection semiconductor optical amplifier array, one end of which is made as a reflective surface, and the other end is connected to the input end of the wavelength router in the cavity;

A wavelength-selection semiconductor optical amplifier array, one end of which is connected to the output end of the wavelength router in the cavity, and the other end is provided with a partial reflector;

An optical resonant cavity is formed between the reflection surface of any port-selection semiconductor optical amplifier and the partial reflector of any wavelength-selection semiconductor optical amplifier;

By applying current to the port-selection semiconductor optical amplifier and the wavelength-selection semiconductor optical amplifier corresponding to any pair of input and output port combinations of the intra-cavity wavelength router, the partial reflector end of the corresponding optical resonant cavity outputs the specific signal at the wavelength corresponding to the input and output port combination.

The laser array converts input electrical signals to optical signals of specified wavelengths and sends them to the internal input ports on one side of the optical routing unit. The optical signals of specified wavelengths are transmitted from the external output ports on the other side of the optical routing unit according to the routing characteristics of the optical routing unit based on each combination of the internal input port and the wavelength.

The external input ports of the optical routing unit receive external optical signals of any operating wavelengths, which are output to the photodetector array at the internal output ports at the other side of the optical routing unit according to the routing characteristics of the optical routing unit based on each combination of the external input port and the signal wavelength; said photodetector array converts the optical signals into electrical signals.

The optical waveguides are in the form of planar optical waveguides or optical fibers, which are used for intra-chip node connection or inter-chip node connection, respectively.

All nodes on the network unit are distributed in a ring, and the nodes are fully connected by optical waveguides arranged along the ring.

The laser array is electrically connected to the laser driver, the photodetector array is electrically connected to the detector driver, and the laser driver and the detector driver are electrically connected to an electronic packet switching chip.

A distributed optical switching and interconnect chip is characterized in that it has a plurality of subnetwork units composed of the distributed optical switching and interconnect chip, to form an extended optical switching and interconnect network on-chip.

Each subnetwork unit of the extended optical switching and interconnect network includes at least one cross-unit node, and the cross-unit node is directly or indirectly connected to the cross-unit nodes in the other subnetwork units via optical waveguides.

A number of subnetwork units are distributed in a ring, and each of the subnetwork units has an inner cross-unit node I, and an outer cross-unit node II. The cross-unit nodes I of each subnetwork unit are connected via optical waveguides arranged along a ring, and the cross-unit nodes II of each subnetwork unit are connected via optical waveguides arranged along a ring.

A number of identical subnetwork units are distributed in a ring, and each node in the subnetwork units is a cross-unit node. The cross-unit nodes at the same position in each subnetwork unit are connected by optical waveguides arranged along a ring to form a fully connected network. Multiple rings of the fully connected networks are formed through multilayer waveguides and interlayer coupling structures so that the waveguide crossings between multiple rings of the fully connected networks are avoided.

The electrical ports for high-speed data input/output, on-chip network control, and bias current/voltage, etc. are preferably connected to external circuit through Ball Grid Array (BGA) package. The electrical ports corresponding to each on-chip node are connected with the electrical input/output ports of external electronic chips or chip groups for computing, storage and I/O through wafer-level advanced packaging technology to form a wafer-level multi-chip computing system with optical switching and interconnects.

The distributed optical switching and interconnect chip includes optical fiber input/output ports, which are connected with some external input/output ports of the optical routing units through optical coupling structures on the chip, for expansion of optical switching and interconnects between multiple wafer-level computing systems.

A distributed optical switching and interconnect system is characterized in that it contains a distributed optical switching and interconnect chip, and peripheral electrical computing or communication chips or chip groups. The electrical chips or chip groups provide input and output ports for electrical interconnection with the output and input ports of the distributed optical switching and interconnect chip through wafer-level advanced packaging.

The modulators and photodetectors of the distributed optical switching network node are connected to optical transmit/receive driver chips through high-speed input/output electrical ports, and then connected to an electrical packet switching chip, which is standalone or incorporated in the transmit/receive controller of the computing chip in the multi-node computing system.

A distributed optical switching and interconnect system is characterized in that it includes a plurality of subnetwork units with the same architecture as the distributed optical switching and interconnect chip, and the nodes in the subnetwork unit and the nodes across the subnetwork units are connected by optical fibers.

The optical routing unit of each network node is an arrayed waveguide grating router, a wavelength selective switch or an electronic switch with optical-electrical-optical conversions. The modulators and photodetectors of the network nodes are connected to the transmit/receive driver chips through high-speed input/output electrical ports, and then connected to the electronic packet switching chip, which is incorporated in the switch boxes connected to the servers in the data center.

The beneficial effects of the present invention are: the invention realizes the optical switching and interconnections between peripheral electrical computing or communication chips or chiplet groups through the distributed optical switching and interconnect chip. The input and output ports of the electronic chips only need to be electrically interconnected with the output and input ports of the distributed optical switching and interconnect chip. There is no need for centralized high-end electronic switch chips, nor does it need to integrate the electronic switch chip with an external optical transceiver array chip through the CPO for optoelectronic packaging. Thereby, the transmission, reception and switching of optical signals are realized at each node by using the distributed optical switching chip and system.

In the present invention, the node can determine the output port of an optical signal on demand. On one hand, the capacity expansion of the optical switching and interconnect system can be realized on-demand, and the number of the network nodes is not limited. On the other hand, the mutual protection can be realized through different paths between the network nodes.

In the present invention, the distributed optical switching and interconnect subnetwork units and the nodes in the subnetwork units are distributed in a ring, and the full-mesh connections between the subnetwork units and between the subnetwork nodes are realized by using optical waveguides arranged along the rings. On one hand, the waveguide crossings are eliminated to reduce the connection loss, and on the other hand, the utilization rate of the chip area is greatly increased.

The invention integrates and encapsulates the laser array, the photodetector array, the optical routing unit and the inter-node interconnection network in one integrated chip. The subnetwork nodes are directly interconnected through planar optical waveguides, without the need for optical fiber connections, and the optical switching/routing is accomplished in the distributed optical switching and interconnect chip, without the need for electrical switching chips made by top-level semiconductor technology. The distributed optical switching and interconnect chip in the present invention can have pure electrical input/output ports, with optional optical ports for inter-chip connections. It has the advantages of small size and low power consumption, and can be used for wafer-level multi-chip computing systems and datacenter optical switching and interconnections.

1, Distributed optical switching and interconnect chip; 101, BGA ball grid; 2, laser array; 201, wavelength switchable laser; 202, modulator; 203, tunable laser; 204, port selectable semiconductor optical amplifier; 205, intracavity wavelength router; 206, wavelength-selection semiconductor optical amplifier; 3, photodetector array; 301, photodetector; 4, optical routing unit; 401, transmitter side routing unit; 402, receiver side routing unit; 5. Optical waveguide; 6. Coupling grating or interlayer coupler; 7. Cross-unit node I; 8. Cross-unit node II; 9. Laser driver; 10. Detector driver; 11. Electronic packet switching chip; 12. Electronic computing chips or chiplet groups.

DETAILED DESCRIPTION OF THE PRESENT INVENTION

Figure 1:
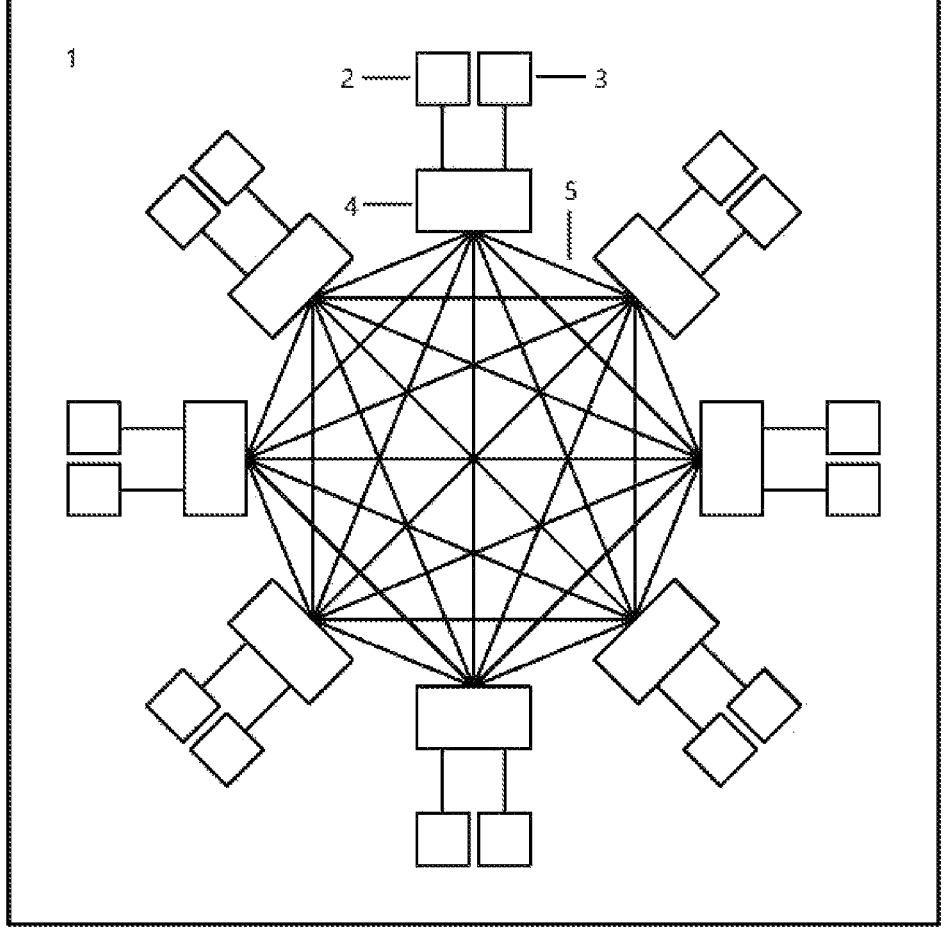
FIG. 1 is a schematic structural diagram of Embodiment 1.

Embodiment 1: As shown in FIG. 1, this embodiment is a distributed optical switching and interconnect chip. The integrated chip contains a distributed optical switching and interconnect network unit. As an example, the network unit has 8 nodes, each node includes optical routing unit, laser array and photodetector array, etc.

In this example embodiment, one side of the optical routing unit has 8 internal input/output ports (bidirectional ports serving as both input and output ports), and the other side has 8 external input/output ports. There is only a minimum loss at a specific wavelength within the operating wavelength range between any pair of an internal port and an external port of the optical routing unit. In this embodiment, the optical routing unit adopts an 8×8 cyclic arrayed waveguide grating router (AWGR) or a cyclic etched diffraction grating router (EDGR). The free spectral range (FSR) of the grating router equals the channel spacing multiplied by the number operating channels, which ensures the cyclic behavior of the wavelength routing characteristics.

In this embodiment, the seven laser units on the laser array and the seven internal input ports on the optical routing unit are connected in one-to-one correspondence through optical waveguides or coupling structures. The laser unit is used to convert an electrical signal into an optical signal and send it to the optical routing unit.

In this embodiment, the 7 photodetector units on the photodetector array and the 7 internal output ports on the optical routing unit are connected one-to-one through optical waveguides or coupling structures. The photodetector unit is used to convert the optical signal received by the optical routing unit into an electrical signal.

In this embodiment, the external input/output port of the optical routing unit is the input/output port of the node where it is located.

The 7 output ports of the node are respectively connected to the input ports of the other 7 nodes in the optical switching and interconnect network unit through the optical waveguides, and the 7 input ports of the node are respectively connected to the outputs of the other 7 nodes in the optical switching and interconnect network unit through the optical waveguides.

In this embodiment, each element of the laser array can convert an input electrical signal to an optical signal of a specified wavelength and send to the internal input port on one side of the optical routing unit. The wavelength is set according to the target receiving node of the signal. Based on the combination of the internal input port and the wavelength, the optical signal is transmitted from a target external output port on the other side of the optical routing unit according to the routing characteristics of the optical routing unit (minimum loss at the specified wavelength between the internal input port and the external output port). The target external output port is connected to an external input port of the target receiving node.

When sending multiple signals to the same target node, optical signals of different wavelengths are transmitted on multiple internal input ports, and are multiplexed on the external output port connected to the target node.

In this embodiment, when the external input port on one side of the optical routing unit receives an externally input optical signal of any operating wavelength, the optical signal is output to the photodetector from an internal output port on the other side of the optical routing unit that is adapted to the combination of the external input port and the wavelength (there is minimal loss at the wavelength between the external input port and the internal output port). The photodetector converts the optical signal into an electrical signal.

When an external input port receives optical signals with multiple different wavelengths at the same time, the optical routing unit outputs the signals of different wavelengths from multiple internal output ports to different elements of the photodetector array respectively.

Figure 2:
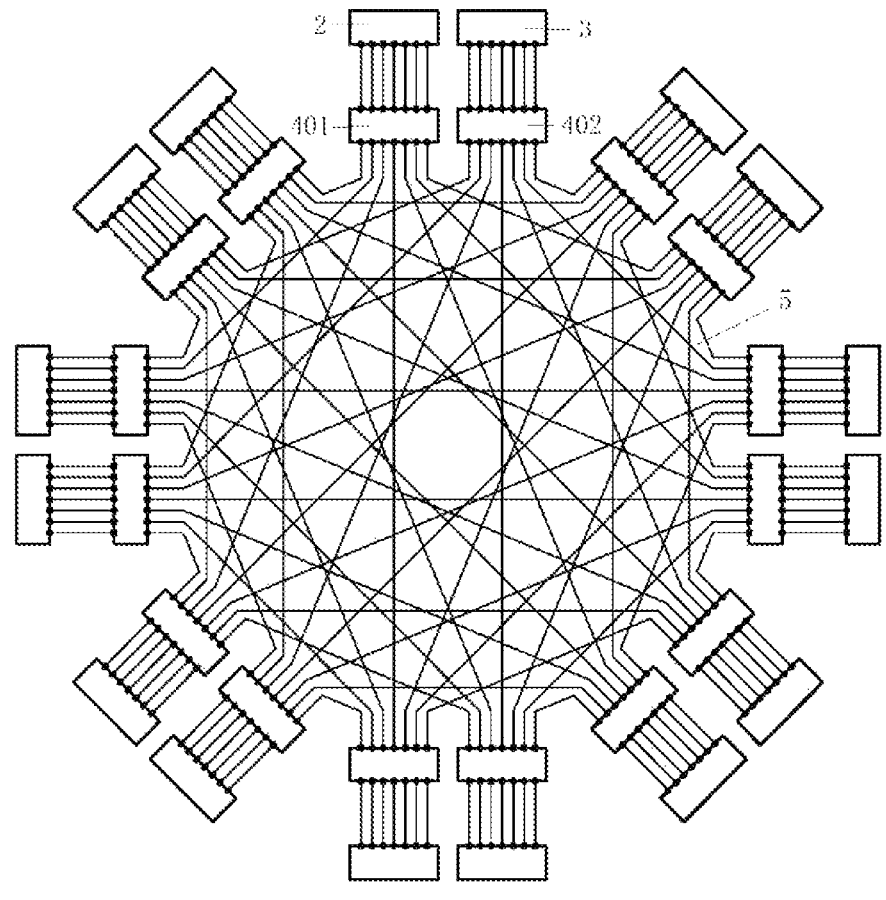
FIG. 2 is a schematic structural diagram of Embodiment 2.

Embodiment 2: As shown in FIG. 2, the structure of this embodiment is basically the same as that of Embodiment 1.

The difference is that each node in this embodiment has 2 optical routing units, which are the transmitter side routing unit and the receiver side routing unit respectively.

In this example embodiment of FIG. 2, one side of the transmitter-side routing unit has seven internal input ports, and the other side has seven external output ports; the receiver-side routing unit has seven internal output ports on one side and seven external input ports on the other side.

In this example embodiment, the seven laser units on the laser array and the seven internal input ports on the transmitter-side routing unit are connected one-to-one through optical waveguides or coupling structures. Each laser unit is used to convert an electrical signal into an optical signal and send it to the transmitter side routing unit.

In this example embodiment, the seven photodetector units on the photodetector array and the seven internal output ports on the receiver-side routing unit are connected one-to-one through optical waveguides or coupling structures. Each photodetector unit is used to convert the optical signal output by the routing unit on the receiver side into an electrical signal. These signals can be dropped to the node or re-routed to the lasers at the transmitter-side by an electronic packet switching chip for re-transmission to other nodes.

Figure 3:
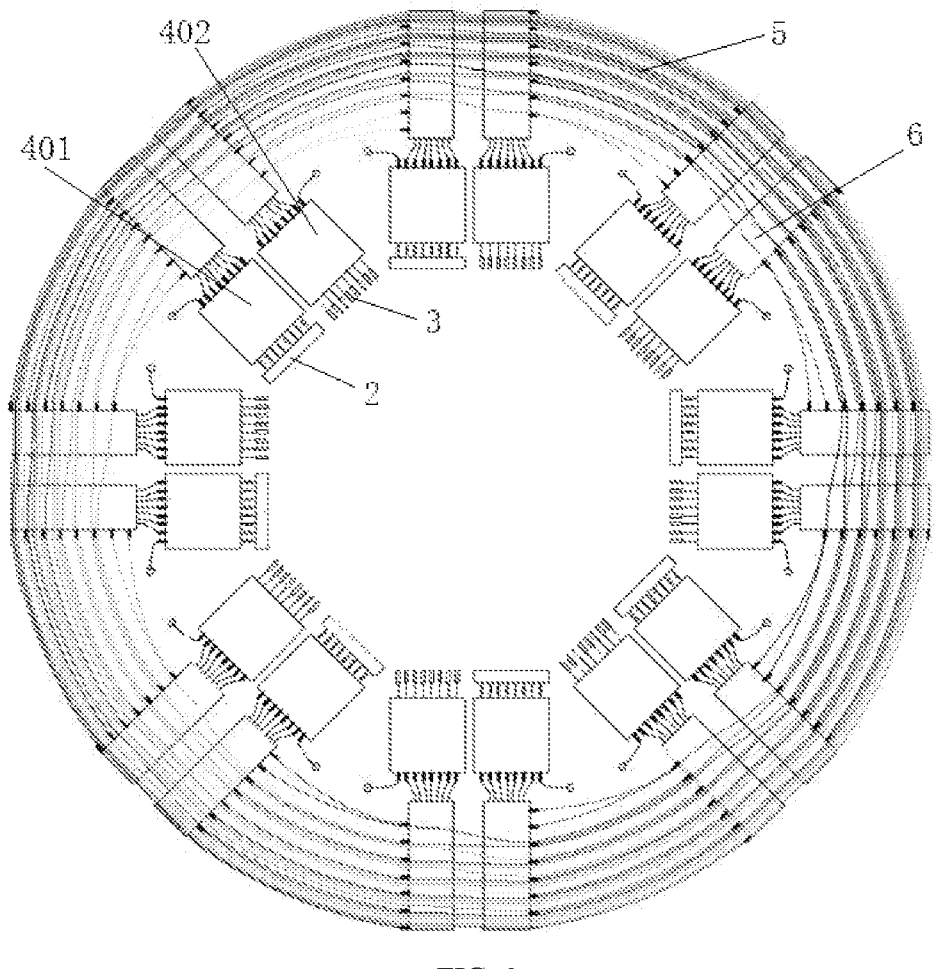
FIG. 3 is a schematic structural diagram of Embodiment 3.

Embodiment 3: As shown in FIG. 3, in this embodiment, the 8 nodes are uniformly distributed in a ring, and they are fully connected one-on-one through the on-chip planar optical waveguides arranged along the ring.

This embodiment achieves physically crossing-free ring waveguide wiring on a silicon photonic chip, eliminating waveguide crossings in the full-mesh connection structure as shown in FIG. 2, thus reducing connection losses, and significantly improving the utilization of chip area. The topology remains full-mesh connections.

In this embodiment, the output ports of the node and the interconnection waveguides are located in different waveguide layers, and are connected to the input ports of the interconnection waveguides through coupling gratings or interlayer couplers. The input ports of the node are located in different waveguide layers with the interconnection waveguides, and are connected to the output ports of the interconnection waveguides through coupling gratings or interlayer couplers.

Due to the high refractive index difference of silicon optical waveguides, the waveguide arrangement can be very tight, with spacing of less than 10 µm. Each node includes 8 wavelength/port switchable lasers, 8 high-speed modulators and 8 high-speed photodetectors, and two 8×8 cyclic wavelength routers for transmitter and receiver, respectively. The wavelength router can be arrayed waveguide grating router AWGR or etched diffraction grating router EDGR. Each node integrates three major functions: optical signal transmission, reception, and switching/routing. The 8 output ports of the wavelength router can be connected with other 7 nodes through optical waveguides to form a fully connected network of 8 nodes, and the remaining output port can be reserved for testing and for inter-chip connection via fiber coupling if needed. If the speed of the modulator is 100 Gbps, the maximum bandwidth of each waveguide connection can reach 800 Gbps (8×100 Gbps), and the bandwidth of any connection can be arbitrarily allocated between 0 and 800 Gbps by switching the laser wavelength/port, thus dynamically scheduling bandwidth resources according to changes in network traffic. The total network switching capacity of the entire 8-node network reaches 6.4 Tbps. Due to the elimination of centralized optical switching nodes and optical-electrical-optical conversions, link loss, power consumption, and latency are reduced.

Figure 4:
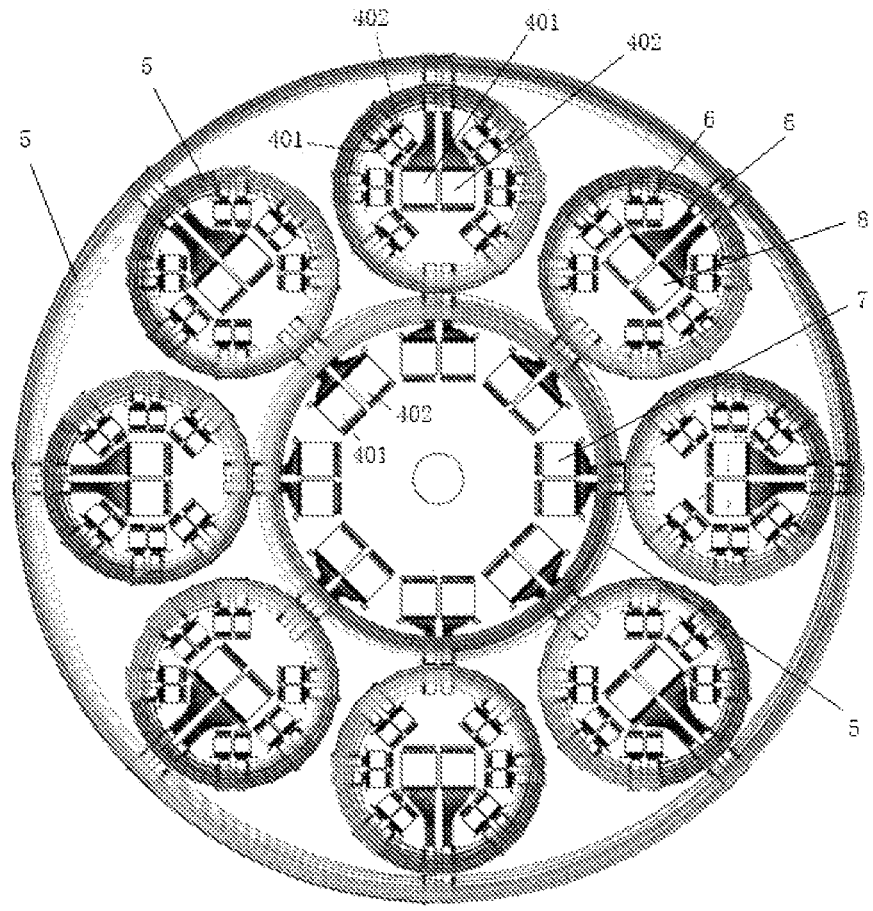
FIG. 4 is a schematic structural diagram of Embodiment 4.

Embodiment 4: As shown in FIG. 4, this embodiment is a distributed optical switching and interconnect chip, in which the distributed optical switching and interconnect network has 8 subnetwork units as described in Embodiment 3, and the 8 subnetwork units are uniformly distributed in a ring.

In this embodiment, the nodes located on the inner side of the subnetwork unit ring are referred to as cross-unit node I, while the nodes located on the outer side of the subnetwork unit ring are referred to as cross-unit node II. Cross-unit nodes I and II both have 16×16 optical routing units, as well as laser arrays and photodetector arrays that are compatible with the 16×16 optical routing units. The 16×16 optical routing unit enables cross-unit nodes I and II to have 16 output ports and 16 input ports.

In this embodiment, the 7 output ports in the cross-unit node I are connected with the input ports of the other 7 nodes on the same subnetwork unit through the optical waveguides arranged along the ring. The other seven output ports in the cross-unit node I are connected to the input ports of the cross-unit node I on the other seven subnetwork units through the optical waveguides arranged along the inner interconnection ring. The 7 input ports in the cross-unit node I are connected with the output ports of the other 7 nodes on the same subnetwork unit through the optical waveguides arranged along the ring. Another seven input ports in the cross-unit node I are connected to the output ports of the cross-unit node I on the other seven subnetwork units through optical waveguides arranged in the outer interconnection ring.

In this embodiment, 7 output ports in the cross-unit node are used for full connection within the subnetwork unit, 7 output ports are used for full connection between subnetwork units, and the remaining 2 output ports are used for inter-chip connections of a multi-chip expansion system through optical fiber coupling if needed. The same is true for input ports.

This embodiment builds a 64-node distributed optical switching and interconnect network. The connection between any two nodes between these 64 nodes can be through direct connection, one-hop connection via one intermediate node, or two-hop connection via two intermediate nodes. And there can be multiple shortest paths or non-shortest paths between any two nodes for selection and protection. The entire network contains 640 lasers and 640 photodetectors, and the total switching capacity expands to 64 Tbps when the single-channel rate is 100 Gbps.

An 8-node fully-connected interconnection network can be further constructed between nodes at the same location of each subnetwork through SiN/SOI multilayer waveguides with interlayer coupling structures (on-chip networks) or through fiber-optic connections (conventional fiber-optic networks). At the same time, all 8×8 nodes are upgraded to 16×16 nodes, and all nodes become completely symmetrical, which can increase the directly connected nodes for each node to 14 (accounting for 22.2%), one-hop nodes to 49 (accounting for 77.8%), completely eliminating the two-hop connections. At the same time the total network switching capacity of the 64 nodes is increased to 102.4 Tbps.

For comparison, consider a Spine-Leaf architecture commonly used in datacenters, which also consists of 8 subnetworks of 8 nodes each, for a total of 64 nodes. The number of nodes connected to any one node is 0 for direct connection and two-hop connection, 7 (11.1%) for one-hop connection via one centralized switching node, and 56 (88.9%) for three-hop connection via 3 centralized switching nodes. Therefore, the distributed switching architecture of this embodiment has a shorter path, lower latency, less optical-electrical-optical conversions and thus lower power consumption. And it provides more abundant paths selectable for fault protection and for avoiding blockage, and can be expanded infinitely with multiple wafer-level systems, and with the recursively expanding architecture.

Figure 5:
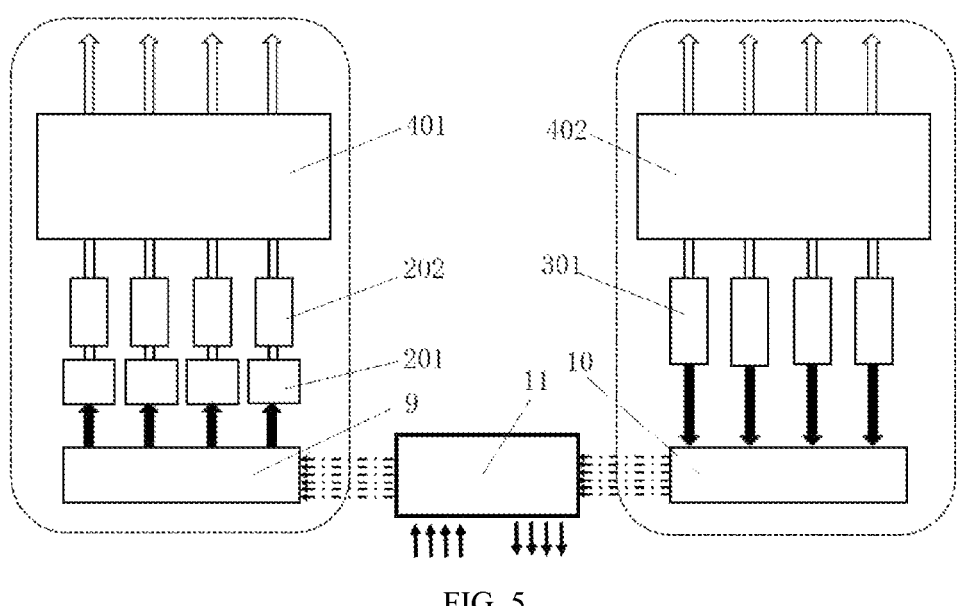
FIG. 5 is a schematic structural diagram of a node in Embodiment 5.
Figure 6:
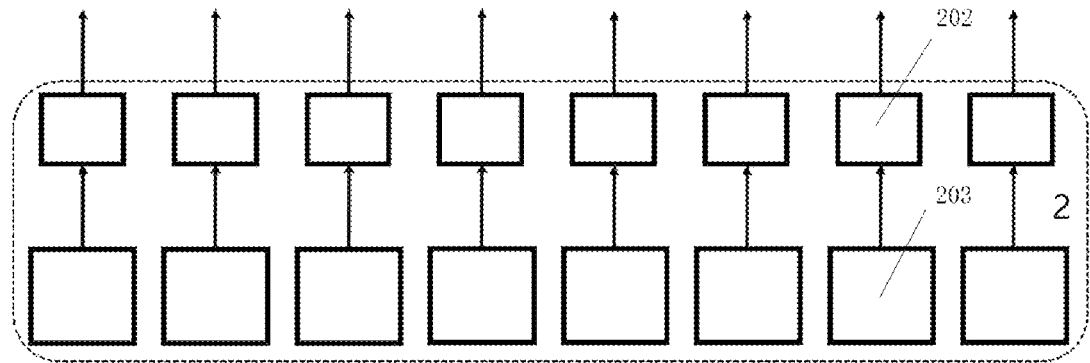
FIG. 6 is a schematic structural diagram of a laser array in Embodiment 6.

Embodiment 5: As shown in FIG. 5, in this embodiment, each laser unit (including a wavelength switchable laser and a modulator) in the laser array of the node and each photodetector in the photodetector array are respectively connected to the laser driver and the detector driver through high-speed input/output electrical ports. The laser driver and the detector driver are jointly connected to the electrical packet switching chip (EPS). The EPS provides uploading and downloading of local data of the corresponding node, and also provides electrical packet switching/routing to forward non-local data. The signals received by the photodetectors at the receiver-side can be dropped to the node or re-routed to the lasers at the transmitter-side by the electronic packet switching chip for re-transmission to other nodes.

The EPS can exist in the top-of-the-rack switch (TOR) box of datacenter servers, or can be integrated in the transmit/receive controller of the computing chips in the servers or wafer-level computing systems. For the switching and interconnect between non-directly connected nodes across different subnetworks in the embodiment shown in FIG. 4, the one-hop or two-hop switching/interconnection is realized through the forwarding of the EPS in the intermediate nodes. The low-capacity transmit/receive controller or electronic switching chip (such as the TOR switch) that already exists in the intermediate transmit/receive node is utilized, which combines the advantages of large-bandwidth optical switching and low granularity electronic packet switching. Both wavelength granularity (elephant level) large-capacity fast optical circuit switching (OCS) or optical burst switching (OBS), and packet granularity (rat level) electronic packet switching are combined seamlessly. At the same time, it also avoids the problems with lack of optical storage and difficulty with packet header parsing in all-optical packet-switched networks.

Due to numerous paths available, the distributed switching network architecture in this embodiment has high protection feature. The failure of a single or some of the components or nodes can be bypassed through self-adaptive intelligent control software, without affecting the operation of the entire network. Therefore, the manufacturing difficulty and cost of large-scale integrated chips can be reduced, as well as the network maintenance cost.

This embodiment of the distributed optical switching and interconnect chip is based on the architecture of modular subnetwork units (e.g., an 8-node fully connected subnetwork), which reduces the difficulty of designing and manufacturing large-scale integrated large-capacity optical switching chips. For example, the optical switching network of 64 nodes and 640 pairs of transmit/receive ports in the embodiment of FIG. 4 is divided into eight modular subnetwork units of 8 nodes, and each node only needs 8 or 16 units of lasers, modulators and photodetectors, and 8×8 or 16×16 wavelength routers. This significantly reduces the difficulty of developing the array units and the wavelength routers. It achieves large-scale integration through symmetric parallel expansion, which reduces the difficulty of network design and testing, improves network scalability, and reduces the complexity of routing algorithms and system control software.

Embodiment 6: The laser array in this embodiment is composed of a plurality of high-speed tunable lasers, and each high-speed tunable laser includes a tunable laser and a high-speed modulator. The tunable laser and the modulator may be monolithically integrated on one chip, and the modulator can be in various forms such as electro-absorption modulation (EA), MZ, and micro-ring.

Embodiment 7: In this embodiment, the laser array includes an intra-cavity wavelength router, a port-selection semiconductor optical amplifier array, and a wavelength-selection semiconductor optical amplifier array, wherein any pair of input and output port combinations of the intra-cavity wavelength router only have the smallest loss at a specific wavelength within an operating wavelength range. One end of the port-selection semiconductor optical amplifier array is made into a reflective surface, and the other end is connected to the input ports of the wavelength router in the cavity. One end of the wavelength-selection semiconductor optical amplifier array is connected to the output ports of the wavelength router in the cavity, and the other end is provided with a partial reflector. An optical resonant cavity is formed between the reflecting surface of any port-selection semiconductor optical amplifier and the partial reflector of any wavelength-selection semiconductor optical amplifier.

In this embodiment, currents are applied to the port-selection semiconductor optical amplifier and the wavelength-selection semiconductor optical amplifier corresponding to the combination of any pair of input and output ports of the intra-cavity wavelength router, so that the output at the partial reflector end of the corresponding optical resonant cavity has a specific wavelength corresponding to the minimum loss between the pair of the input and output ports.

The laser array in this embodiment is a core technology for realizing nanosecond high-speed optical switching. It simultaneously realizes the two functions of multi-wavelength transmission and optical switching.

Figure 7:
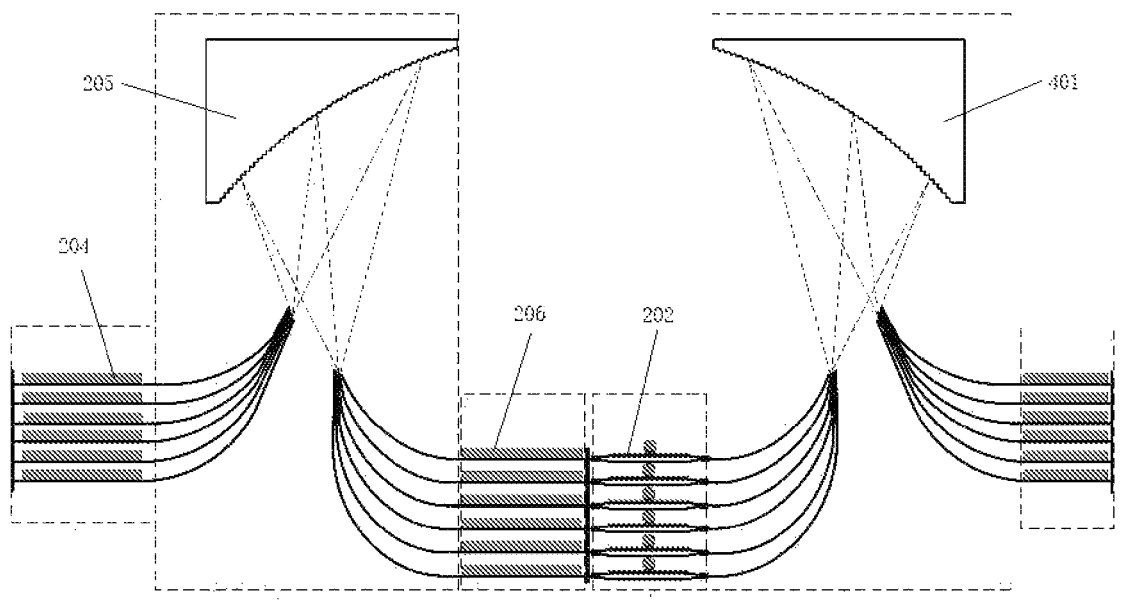
FIG. 7 is a schematic structural diagram of the laser array and the transmitter side routing unit in Embodiment 7.

FIG. 7 is the optical transmission-switching unit composed of the laser array and the transmitter-side routing unit in the embodiment. It is composed of an intra-cavity part and an extra-cavity part, each part includes an 8×8 cyclic etched diffraction grating router (EDGR) (which can be replaced by an arrayed waveguide grating router AWGR). The two parts are mirror images of each other. By selectively applying current on one optical amplifier in the array of the port-selection semiconductor optical amplifiers, each output port of the array of the wavelength-selection semiconductor optical amplifiers will output one laser wavelength corresponding to the wavelength with minimum loss between the selectively turned-on port-selection semiconductor optical amplifier and the corresponding wavelength-selection semiconductor optical amplifier.

The eight lasers of different wavelengths output from the intra-cavity part are modulated at high speed by the modulator array and then multiplexed by the EDGR outside the cavity, and then output at one output port. The position of the output port in its array corresponds to the position of the turned-on port-selection semiconductor optical amplifier in its array.

By using 8×8 cyclic EDGR (or AWGR) in this embodiment, the transmission-switching unit can selectively transmit any one or all of the 8 wavelengths in the 8 laser output ports by switching on the corresponding wavelength-selection semiconductor optical amplifiers. The wavelengths are automatically adapted to the selected laser output port, while the set of 8 wavelengths remains unchanged, and is finally output at the selected output port after multiplexing by the extra-cavity EDGR wavelength router.

Figure 8:
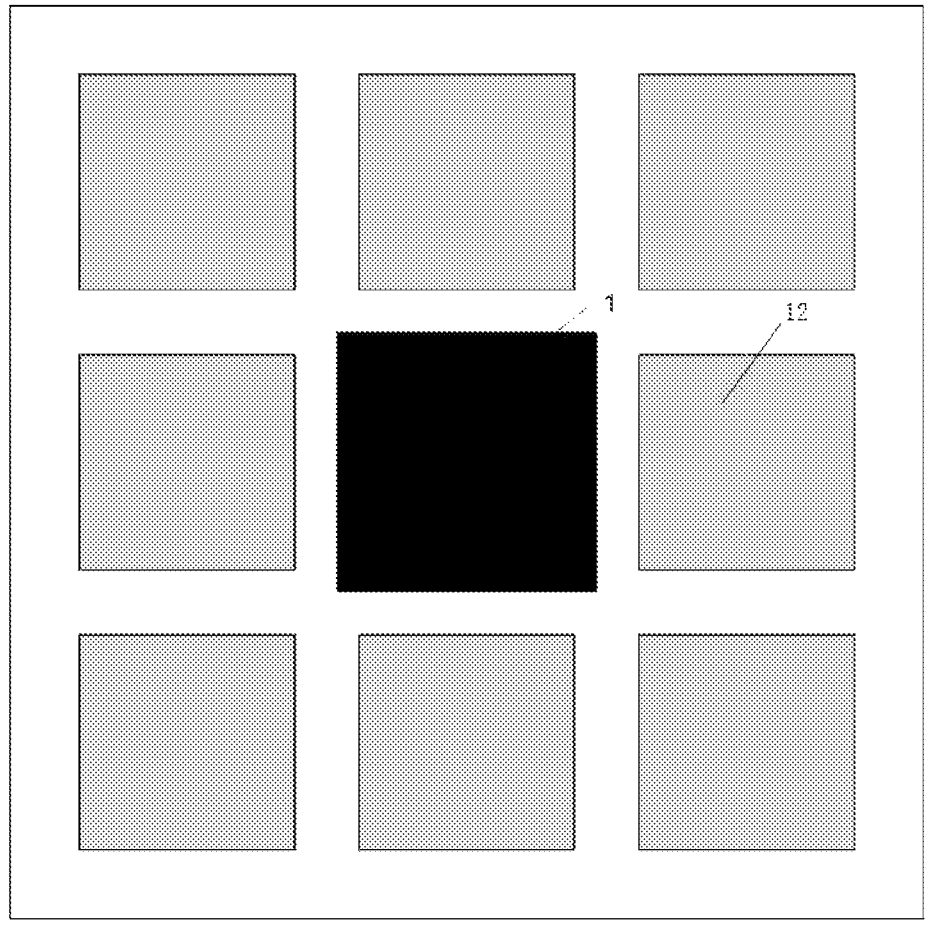
FIG. 8 is a system block diagram of Embodiment 8.

Embodiment 8: As shown in FIG. 8, this embodiment is a schematic of a wafer-level computing system, including the distributed optical switching and interconnect chip in any one of Embodiments 1 to 7 and a plurality of peripheral electronic computing or communication chips or chiplet groups. The distributed optical switching and interconnect chip is responsible for providing optical switching, and the peripheral electrical computing or communication chips or chiplet groups include computing chips, memory chips, I/O chips, electronic switching chips, and driver chips. The input and output ports of the electronic chips are respectively connected with the output and input ports of the distributed optical switching and interconnect chip to provide electrical interconnection through wafer-level advanced packaging.

Figure 9:
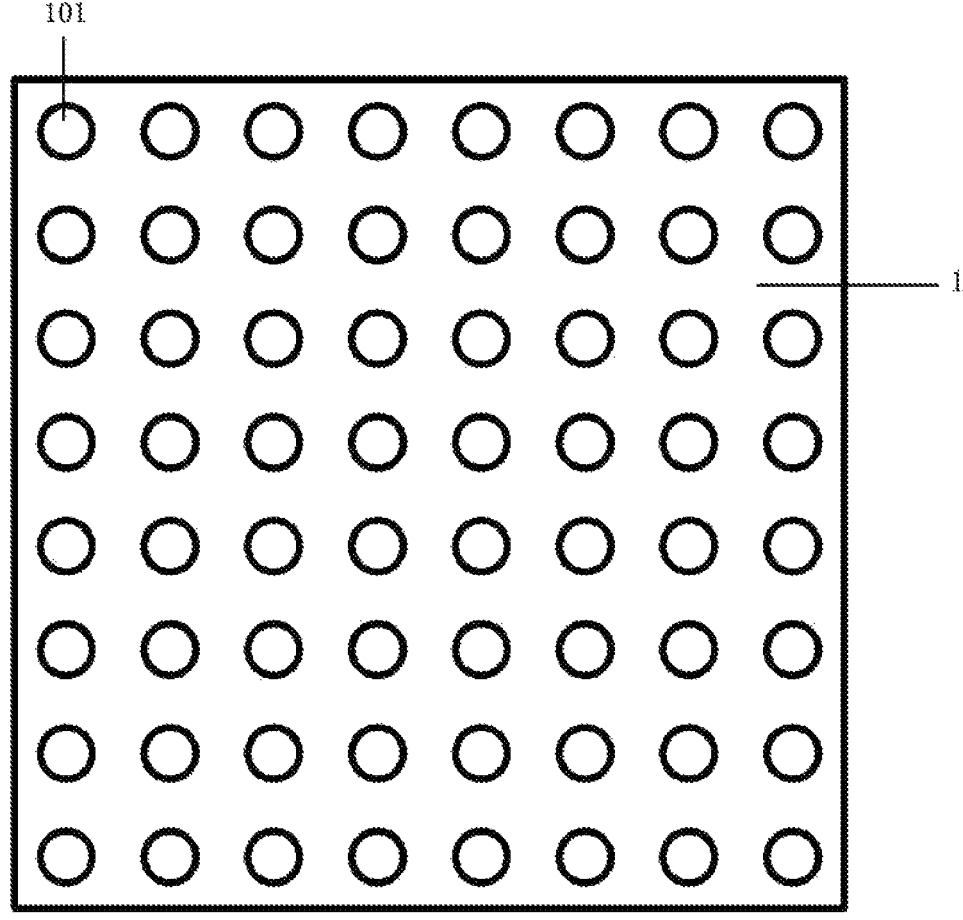
FIG. 9 is a bottom view of an example BGA package of an integrated chip in Embodiment 9.

Embodiment 9: The structure of this embodiment is basically the same as that of any one of Embodiments 1 to 7. In this embodiment, the optical routing unit, the laser array, the photodetector array and the interconnecting network between nodes on the chip are packaged into a Ball Grid Array (BGA) packaged chip. FIG. 9 is a bottom view of the integrated chip with the BGA packaging. In this embodiment, all the optical switching and interconnects are completed inside the chip, and the external interfaces are ball-grid-array electrical interfaces, without input and output fiber ports. The external electrical interface includes high-speed data input/output ports, switching control ports, power-supply and bias current/voltage ports, etc. The electrical interface of the optical switching and interconnect chip and the electrical interface of the electronic chips are interconnected through wafer-level advanced packaging.

Figure 10:
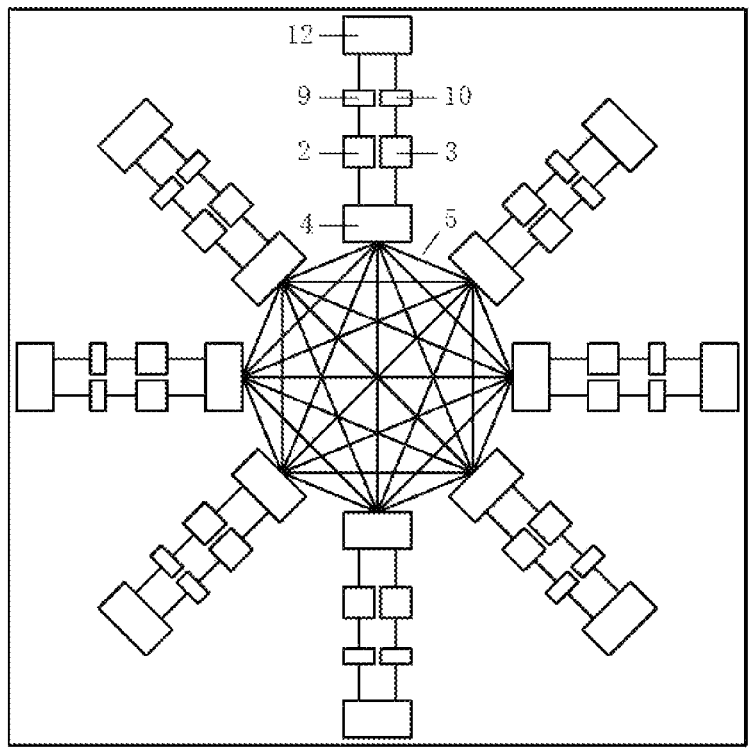
FIG. 10 is a schematic structural diagram of a wafer-level multi-chip computing system with the distributed optical switching and interconnect in Embodiment 10.

Embodiment 10: As shown in FIG. 10, this embodiment is a wafer-level optical switching and interconnect computing system, which integrates electronic computing (CPU) or communication chips or chiplet groups, a laser driver array, a detector driver array, and the distributed optical switching and interconnect chip described in any one of Embodiments 1 to 7.

The laser driver array provides DC bias currents, high-speed wavelength switching controls and high-speed signal modulation signals to the lasers. The laser drivers are electrically connected with the laser electrodes through bonding. The detector driver array integrates small-signal amplification, limiting amplification and clock recovery. After the photodetector receives the high-speed optical signal, it is converted into a high-speed electrical signal through the photoelectric effect, and is input to the detector driver array through high-speed links. The high-speed electrical signal is first amplified by a low-noise amplifier, and then input to the limiting amplifier, where it is amplified to a specified amplitude. The signal quality is restored by the clock recovery module, and then output to electronic chips through the high-speed electrical interface of the optical chip.

The wafer-level optical switching and interconnect computing system can include shared memory for storing node information, routing algorithms, and shared routing information of the node. The shared memory is electrically interconnected with all CPUs, and each CPU can read its own node information, obtain shared routing information, and update a specific or common network status. The CPUs may coordinate routing information and instructions with each other through shared memory.

The network architecture of the distributed optical switching and interconnect chip and the wafer-level computing system of the present invention can also be used for off-chip computing or communication systems, with the on-chip planar waveguides replaced by optical fibers, and the laser and photodetector arrays replaced by transceiver modules. The optical routing unit of each network node can take the forms of arrayed waveguide grating router based on planar lightwave circuit (PLC), a wavelength selective switch (WSS), or an electronic switch with optical-electrical-optical conversions.

The above embodiments are only used to illustrate the inventive concept of the present invention, but not to limit the protection of the rights of the present invention. Any non-substantial changes to the present invention by using this concept should fall within the protection scope of the present invention.

What is claimed is:

1. A distributed optical switching and interconnect chip, characterized in that it has a plurality of directly or indirectly connected nodes, and each node comprises:

an optical routing unit, which has a plurality of internal input/output ports on one side and a plurality of external input/output ports on the other side;

a laser array, connected to the internal input ports of the optical routing unit, for converting electrical signals into optical signals and sending them to the optical routing unit, wherein the laser array is operable to integrate with a high-speed modulator array which comprises modulators;

a photodetector array, connected to the internal output ports of the optical routing unit, for converting the optical signals received by the optical routing unit into electrical signals;

said external input/output ports of the optical routing unit are the input/output ports of the corresponding node, and the output ports of the node are connected to the input ports of other nodes through optical waveguides;

said photodetector array is configured to convert optical signals received at the external input ports into electrical signals, which are operable to be dropped to the node or re-routed to the lasers by an electronic switching chip for re-transmission to other nodes through the external output ports; and the laser array is electrically connected to a laser driver, and the photodetector array is electrically connected to a detector driver, wherein both the laser driver and the detector driver are electrically connected to the electronic switching chip.

2. The distributed optical switching and interconnect chip according to claim 1, characterized in that:

each node has two of the optical routing units, corresponding to the transmitter-side routing unit and the receiver-side routing unit, respectively;

said transmitter-side routing unit has internal input ports connected to lasers, and external output ports; said receiver-side routing unit has internal output ports connected to photodetectors, and external input ports;

said photodetectors are configured to convert the optical signals received at the external input ports into electrical signals, which are operable to be dropped to the node or re-routed to the lasers by the electronic switching chip for re-transmission to other nodes through the external output ports; and said optical routing unit is configured such that, between any internal port and any external port, a connection loss at a specific wavelength within an operating wavelength range of the optical routing unit is lower than connection losses at other wavelengths within the operating wavelength range of the optical routing unit.

3. The distributed optical switching and interconnect chip according to claim 1, characterized in that:

said optical routing unit adopts a cyclic arrayed waveguide grating router or a cyclic etched diffraction grating router.

4. The distributed optical switching and interconnect chip according to claim 1 characterized in that:

each element of the laser array is composed of a wavelength-switchable or tunable laser integrated with a corresponding one of the modulators.

5. The distributed optical switching and interconnect chip according to claim 1, wherein the laser array comprises:

an intracavity wavelength router, wherein the intracavity wavelength router is configured such that, between any combination of input and output ports, a connection loss at a specific wavelength within an operating wavelength range of the intracavity wavelength router is lower than connection losses at other wavelengths within the operating wavelength range of the intracavity wavelength router;

a port-selection semiconductor optical amplifier array, one end of which is made as a reflective surface, and the other end is connected to the input end of the wavelength router in the cavity;

a wavelength-selection semiconductor optical amplifier array, one end of which is connected to the output end of the wavelength router in the cavity, and the other end is provided with a partial reflector;

an optical resonant cavity is formed between the reflection surface of any port-selection semiconductor optical amplifier and the partial reflector of any wavelength-selection semiconductor optical amplifier; and by applying current to the port-selection semiconductor optical amplifier and the wavelength-selection semiconductor optical amplifier corresponding to any pair of input and output port combinations of the intracavity wavelength router, the partial reflector end of the corresponding optical resonant cavity outputs the specific signal at the wavelength corresponding to the input and output port combination.

6. The distributed optical switching interconnect chip according to claim 1, characterized in that:

said laser array converts input electrical signals to optical signals of specified wavelengths and sends them to the internal input ports on one side of the optical routing unit; said optical signals of specified wavelengths are transmitted from the external output ports on the other side of the optical routing unit according to the routing characteristics of the optical routing unit based on each combination of the internal input port and the wavelength; and the external input ports of the optical routing unit receive external optical signals of any operating wavelengths, which are output to the photodetector array at the internal output ports at the other side of the optical routing unit according to the routing characteristics of the optical routing unit based on each combination of the external input port and the signal wavelength; said photodetector array converts the optical signals into electrical signals.

7. The distributed optical switching and interconnect chip according to claim 1, characterized in that:

said optical waveguides are in the form of planar optical waveguides or optical fibers, which are used for intrachip node connection or inter-chip node connection, respectively.

8. The distributed optical switching and interconnect chip according to claim 1, characterized in that:

all nodes on a network unit of the distributed optical switching and interconnect chip are distributed in a ring, and the nodes are fully connected by optical waveguides arranged along the ring.

9. A distributed optical switching and interconnect chip, characterized in that it has a plurality of subnetwork units composed of the distributed optical switching and interconnect chip described in claim 1, to form an extended optical switching and interconnect network;

each subnetwork unit of the extended optical switching and interconnect network includes at least one cross-unit node, said cross-unit node is directly or indirectly connected to the cross-unit nodes in the other subnetwork units via optical waveguides.

10. The distributed optical switching and interconnect chip according to claim 9, characterized in that:

a number of subnetwork units are distributed in a ring, and each of the subnetwork units has an inner cross-unit node I, and an outer cross-unit node II, said cross-unit nodes I of each subnetwork unit are connected via optical waveguides arranged along an inner ring; said cross-unit nodes II of each subnetwork unit are connected via optical waveguides arranged along an outer ring.

11. The distributed optical switching and interconnect chip according to claim 9, characterized in that:

a number of identical subnetwork units are distributed in a ring, and each node in the subnetwork units is a cross-unit node;

said cross-unit nodes at the same position in each subnetwork unit are connected by optical waveguides arranged along a ring to form a fully connected network; and multiple rings of said fully connected networks are formed through multilayer waveguides and interlayer coupling structures so that the waveguide crossings between multiple rings of the fully connected networks are avoided.

12. The distributed optical switching and interconnect chip according to claim 9, characterized in that:

the electrical ports for high-speed data input/output, on-chip network control, and bias current/voltage, etc. are preferably connected to external circuit through Ball Grid Array (BGA) package; and said electrical ports corresponding to each on-chip node are connected with the electrical input/output ports of external electronic chips or chiplet groups for computing, storage and I/O through wafer-level advanced packaging technology to form a wafer-level multi-chip computing system with optical switching and interconnects.

13. The distributed optical switching and interconnect chip according to claim 9, characterized in that:

it includes optical fiber input/output ports, which are connected with some external input/output ports of the optical routing units through optical coupling structures on the chip, for expansion of optical switching and interconnects between multiple wafer-level computing systems.

14. A distributed optical switching and interconnect system, characterized in that:

it contains a distributed optical switching and interconnect chip described in claim 9, and peripheral electrical computing or communication chips or chiplet groups; said electrical chips or chiplet groups provide input and output ports for electrical interconnection with the output and input ports of the distributed optical switching and interconnect chip through wafer-level advanced packaging.

15. The distributed optical switching and interconnect system according to claim 14, characterized in that: the modulators and photodetectors of the distributed optical switching network node are connected to optical transmit/receive driver chips through high-speed input/output electrical ports, and then connected to an electrical packet switching chip, which is standalone or incorporated in the transmit/receive controller of the computing chip in the multi-node computing system.

16. A distributed optical switching and interconnect system, characterized in that it includes a plurality of subnetwork units with the same architecture as the distributed optical switching and interconnect chip described in claim 1, and the nodes in the subnetwork unit and the nodes across the subnetwork units are connected by optical fibers.

17. The distributed optical switching and interconnect system according to claim 16, characterized in that: the optical routing unit of each network node is an arrayed waveguide grating router, a wavelength selective switch or an electronic switch with optical-electrical-optical conversions; the modulators and photodetectors of the network nodes are connected to the transmit/receive driver chips through high-speed input/output electrical ports, and then connected to the electronic switching chip, which is incorporated in the switch boxes connected to servers in the datacenter.

\*　\*　\*　\*　\*